US012754097B2

(12) United States Patent
Root et al.

(10) Patent No.: US 12,754,097 B2
(45) Date of Patent: Oct. 6, 2026

(54) STRUCTURAL INSPECTION USING MULTI-TONE STEADY STATE EXCITATION

(71) Applicants: Chevron U.S.A. Inc., San Ramon, CA (US); Triad National Security, LLC, Los Alamos, CA (US)

(72) Inventors: Alison Hayley Root, Los Alamos, NM (US); Eric Brian Flynn, Los Alamos, NM (US); Adam Joseph Wachtor, Los Alamos, NM (US); Robert Kwan Meng Seah, Cypress, TX (US); Ian Thomas Cummings, Los Alamos, NM (US); Rodney F. Deschamps, Houston, TX (US); Erica Marie Jacobson, Los Alamos, NM (US)

(73) Assignees: Chevron U.S.A. Inc., San Ramon, CA (US); Triad National Security, LLC, Los Alamos, NM (US)

( * ) Notice: Subject to any disclaimer, the term of this patent is extended or adjusted under 35 U.S.C. 154(b) by 305 days.

(21) Appl. No.: 18/694,776

(22) PCT Filed: Oct. 7, 2021

(86) PCT No.: PCT/US2021/054012
§ 371 (c)(1),
(2) Date: Mar. 22, 2024

(87) PCT Pub. No.: WO2023/059328
PCT Pub. Date: Apr. 13, 2023

(65) Prior Publication Data

US 2024/0393206 A1 Nov. 28, 2024

(51) Int. Cl.
*G01M 7/02* (2006.01)

(52) U.S. Cl.
CPC .................................. *G01M 7/025* (2013.01)

(58) Field of Classification Search
CPC .. G01M 7/025; G01M 5/0033; G01M 5/0066; G01N 29/043; G01N 2291/0258;
(Continued)

(56) References Cited

U.S. PATENT DOCUMENTS 4,567,764 A 2/1986 Jamison
6,393,384 B1 5/2002 Anthony
(Continued)

FOREIGN PATENT DOCUMENTS

CN 113686968 A 11/2021
GB 1315704 A 5/1973
(Continued)

OTHER PUBLICATIONS

Alleyne, D. et al. "A two-dimensional Fourier transform method for the measurement of propagating multimode signals". J. Acoust. Soc. Am., vol. 89(3), Mar. 1991, pp. 1159-1168. (Year: 1991).
(Continued)

*Primary Examiner* — Thomas M Hammond, III
(74) *Attorney, Agent, or Firm* — Esplin & Associates, PC

(57) ABSTRACT

Different frequencies for steady state excitation of the structure may be tested by sweeping over an excitation frequency range. Partial measurements of the responses in the structure at different excitation frequencies may be used to select excitation frequencies, and the selected excitation frequencies may be used to inspect the structure.

19 Claims, 6 Drawing Sheets

(58) Field of Classification Search

CPC ...... G01N 29/07; G01N 29/11; G01N 29/348; G01N 29/46; G01H 1/06; G06Q 10/0635; G06Q 10/06395; G06Q 50/04; G06Q 50/06; G06Q 50/08

See application file for complete search history.

(56) References Cited

U.S. PATENT DOCUMENTS

| | | | | |
|---|---|---|---|---|
| 6,487,909 | B2 | 12/2002 | Harrold | |
| 9,880,133 | B1 | 1/2018 | Stephanou | |
| 10,444,195 | B2 | 10/2019 | Bingham | |
| 10,794,836 | B1 | 10/2020 | Flynn | |
| 11,022,429 | B2 | 6/2021 | Stull | |
| 2002/0186379 | A1 | 12/2002 | Drake | |
| 2005/0004457 | A1 | 1/2005 | Moilanen | |
| 2006/0052979 | A1 | 3/2006 | Park | |
| 2006/0144147 | A1 | 7/2006 | Ishimaru | |
| 2008/0006087 | A1* | 1/2008 | Winter | G01B 17/02 73/584 |
| 2011/0016975 | A1 | 1/2011 | Glaesemann | |
| 2012/0144642 | A1 | 6/2012 | Steinkraus | |
| 2013/0160552 | A1 | 6/2013 | Nakata | |
| 2013/0312529 | A1 | 11/2013 | Park | |
| 2014/0208852 | A1 | 7/2014 | Instanes | |
| 2015/0049343 | A1 | 2/2015 | Shaked | |
| 2015/0148955 | A1 | 5/2015 | Chin | |
| 2015/0204822 | A1 | 7/2015 | Horan | |
| 2015/0300995 | A1* | 10/2015 | Flynn | G01N 29/2418 73/602 |
| 2018/0003680 | A1 | 1/2018 | Kannajosyula | |
| 2019/0186898 | A1* | 6/2019 | Stull | G01B 11/0666 |
| 2019/0331820 | A1 | 10/2019 | Goodman | |
| 2020/0191754 | A1* | 6/2020 | Findikoglu | G01N 29/223 |
| 2021/0041352 | A1 | 2/2021 | Flynn | |
| 2021/0237120 | A1* | 8/2021 | Croxford | B06B 1/0269 |
| 2021/0350818 | A1 | 11/2021 | Biswas | |
| 2022/0291175 | A1* | 9/2022 | Chang | G01N 29/46 |
| 2023/0080178 | A1 | 3/2023 | Hajjar | |
| 2023/0288375 | A1 | 9/2023 | Jacobson | |

FOREIGN PATENT DOCUMENTS

| | | | |
|---|---|---|---|
| GB | 2545271 | A | 6/2017 |
| JP | H05504840 | | 7/1993 |
| JP | 2011247737 | | 12/2011 |
| JP | 2013170845 | A | 9/2013 |
| JP | 2016024186 | | 2/2016 |
| JP | 2018077110 | A | 5/2018 |
| JP | 2019513217 | | 5/2019 |
| JP | 2020139746 | | 9/2020 |
| WO | 2013161835 | A1 | 10/2013 |
| WO | 2024092345 | | 5/2024 |

OTHER PUBLICATIONS

Flynn, E.B. et al. “High-speed, non-contact, baseline-free imaging of hidden defects using scanning laser measurements of steady-state ultrasonic vibration”. Structural Health Monitoring 2013, 2013, pp. 1-8. (Year: 2013).

Kostli, Kornel P. et al. “Two-dimensional photoacoustic imaging by use of Fourier-transform image reconstruction and a detector with an anisotropic response”. Applied Optics, vol. 42, No. 10, Apr. 1, 2003, pp. 1899-1908. (Year: 2003).

Moreau, Ludovic. “Monitoring ice thickness and elastic properties from the measurement of leaky guided waves: A laboratory experiment”. J. Acoust. Soc. Am., vol. 142(5), Nov. 2017, pp. 2873-2880. (Year: 2017).

Schoonover, Robert W. et al. “Numerical investigation of the effects of shear waves in transcranial photoacoustic tomography with a planar geometry”. Journal of Biomedical Optics, vol. 17(6), Jun. 2012, pp. 061215-1-061215-11. (Year: 2012).

Stull, et al. On the Theoretical Limitations in Estimating Thickness of a Plate-Like Structure From a Full-Field Single-Tone Response Lamb Wave Measurement, Los Alamos National Laboratory, Sep. 2017 (16 pages).

PCT Search Report and Written Opinion for Application No. PCT/2021/054012, mailed Feb. 3, 2022 (9 pages).

PCT Search Report and Written Opinion for Application No. PCT/2023/013638.

Translation for WO 2013/161835 A1 (Year: 2013) (71 pages).

“Nondestructive Acoustic Method and Device, for the Determination of Detachments of Mural Paintings”; Jan. 28, 2003; (30 pgs).

PCT International Search Report for PCT Application No. PCT/US2025/060105 mailed Feb. 20, 2026, (14 pages).

Tokioka Masatake, et al. “Method for Detecting Separation of Wall Finish of Building”; Jan. 11, 1994; (9 pgs).

Yamada Ryuzo, et al. “Method and Device for Inspecting Defect”; Jan. 1, 1997; (8 pgs).

* cited by examiner

STRUCTURAL INSPECTION USING MULTI-TONE STEADY STATE EXCITATION

STATEMENT REGARDING FEDERAL RIGHTS

The United States government has certain rights in this invention pursuant to Contract No. 89233218CNA000001 between the United States Department of Energy and TRIAD National Security, LLC for the operation of Los Alamos National Laboratory.

The present application is a national stage application of International Application No. PCT/US2021/054012, filed Oct. 7, 2021, entitled "STRUCTURAL INSPECTION USING MULTI-TONE STEADY STATE EXCITATION," the entirety of which is hereby incorporated herein by reference.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

TECHNICAL FIELD

The present disclosure relates generally to the field of inspecting structures using multi-tone steady state excitation of the structures.

BACKGROUND

Steady state wavefield measurement of a structure may be used to identify defects in the structure. However, such inspection of the structure may be unable to identify defects that are smaller than the order of the wavelength used. Transient wavefield measurement of the structure may be used to identify such small defects, but transient wavefield measurement of the structure may be time-consuming.

SUMMARY

This disclosure relates to inspecting a structure. Preliminary acoustic excitations may be generated in a structure using multiple excitation frequencies. Measurements of the preliminary acoustic excitations in the structure may be obtained. A subset of the multiple excitation frequencies may be selected to be used to inspect the structure based on the measurements of the preliminary acoustic excitations in the structure and/or other information. Inspection acoustic excitations may be generated in the structure using the subset of the multiple excitation frequencies. Measurements of the inspection acoustic excitations in the structure may be obtained. One or more properties of the structure may be determined based on the measurements of the inspection acoustic excitations in the structure and/or other information.

A system that inspects a structure may include one or more electronic storage, one or more acoustic excitation devices, one or more acoustic measurement devices, one or more processors and/or other components. The electronic storage may store information relating to a structure, preliminary acoustic excitations in a structure, selection of excitation frequencies, inspection acoustic excitations in a structure, properties of a structure, and/or other information.

In some implementations, a structure may include a hollow structure, a support structure, a moving structure, and/or other structure. A hollow structure may include a vehicle, a container, a pipe, and/or other hollow structure. A support structure may include an installation, a platform, a frame, a crane, a beam, and/or other support structure. A moving structure may include a turbine blade and/or other moving structure.

The acoustic excitation device(s) may be configured to generate acoustic excitations in the structure. The acoustic excitation device(s) may be configured to generate preliminary acoustic excitations in the structure, inspection acoustic excitations in the structure, and/or other acoustic excitations in the structure. The preliminary acoustic excitations may be generated in the structure using multiple excitation frequencies. The inspection acoustic excitations may be generated in the structure using a subset of the multiple excitation frequencies.

The acoustic measurement device(s) may be configured to measure the acoustic excitations in the structure. The acoustic measurement device(s) may be configured to measure the preliminary acoustic excitations in the structure, the inspection acoustic excitations in the structure, and/or acoustic excitations in the structure.

The processor(s) may be configured by machine-readable instructions. Executing the machine-readable instructions may cause the processor(s) to facilitate inspecting a structure. The machine-readable instructions may include one or more computer program components. The computer program components may include one or more of a preliminary excitation component, a preliminary measurement component, an excitation frequency selection component, an inspection excitation component, an inspection measurement component, a property component, and/or other computer program components.

The preliminary excitation component may be configured to generate preliminary acoustic excitations in the structure. The preliminary acoustic excitations may be generated in the structure using the acoustic excitation device(s). The preliminary acoustic excitation may be generated in the structure using multiple excitation frequencies. In some implementations, the preliminary acoustic excitations in the structure may include preliminary steady state acoustic excitations in the structure.

In some implementations, the structure may include a steel plate having steel columns and steel plate stiffeners, and the preliminary acoustic excitations may be generated by one or more transducers attached to one or more of the steel columns. In some implementations, the structure may include a steel pipe section, and the preliminary acoustic excitations may be generated by one or more transducers attached to the steel pipe section The preliminary measurement component may be configured to obtain measurements of the preliminary acoustic excitations in the structure. The measurements of the preliminary acoustic excitations in the structure may be obtained using the acoustic measurement device(s). In some implementations, the measurements of the preliminary acoustic excitations in the structure may include partial measurements of the preliminary acoustic excitations in the structure. In some implementations, the measurements of the preliminary acoustic excitations in the structure may include measurements of velocity responses in the structure.

The excitation frequency selection component may be configured to select a subset of the multiple excitation frequencies. The subset of the multiple excitation frequencies may be selected to be used to inspect the structure. The subset of the multiple excitation frequencies may be selected based on the measurements of the preliminary acoustic excitations in the structure and/or other information.

In some implementations, selection the subset of the multiple excitation frequencies to be used to inspect the structure, based on the measurements of the preliminary acoustic excitations in the structure, may include selection of the subset of the multiple excitation frequencies based on summary statistic of the velocity responses in the structure.

The inspection excitation component may be configured to generate inspection acoustic excitations in the structure. The inspection acoustic excitations may be generated in the structure using the acoustic excitation device(s). The inspection acoustic excitations may be generated in the structure using the subset of the multiple excitation frequencies. In some implementations, the inspection acoustic excitations in the structure may include inspection steady state acoustic excitations in the structure.

In some implementations, the structure may include a steel plate having steel columns and steel plate stiffeners, and the inspection acoustic excitations may be generated by one or more transducers attached to one or more of the steel columns. In some implementations, the structure may include a steel pipe section, and the inspection acoustic excitations may be generated by one or more transducers attached to the steel pipe section The inspection measurement component may be configured to obtain measurements of the inspection acoustic excitations in the structure. The measurements of the inspection acoustic excitations in the structure may be obtained using the acoustic measurement device(s). In some implementations, the measurements of the inspection acoustic excitations in the structure may include full measurements of the inspection acoustic excitations in the structure. In some implementations, the measurements of the inspection acoustic excitations in the structure may include measurements of velocity responses in the structure.

The property component may be configured to determine one or more properties of the structure. The propert(ies) of the structure may be determined based on the measurements of the inspection acoustic excitations in the structure and/or other information.

In some implementations, determination of the propert (ies) of the structure, based on the measurements of the inspection acoustic excitations in the structure, may include: (1) generation of damage maps of the structure based on the measurements of the inspection acoustic excitations in the structure, (2) generation of a combined damage map from the damage maps, and (3) determination of the propert(ies) of the structure based on the combined damage map and/or other information.

In some implementations, the damage map(s) may be generated based on filtering the measurements of the inspection acoustic excitations in the structure and/or other information.

In some implementations, the propert(ies) of the structure may include one or more defects in the structure. In some implementations, the defect(s) in the structure may include material addition, material loss, material cracking, and/or other defect(s).

In some implementations, the propert(ies) of the structure determined based on the inspection acoustic excitations in the structure may include pitting, corrosion, and/or cracking of a steel plate. In some implementations, the propert(ies) of the structure determined based on the inspection acoustic excitations in the structure may include pitting, corrosion, and/or cracking of a steel pipe section.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to inspecting a structure. Different frequencies for steady state excitation of the structure may be tested by sweeping over an excitation frequency range. Partial measurements of the responses in the structure at different excitation frequencies may be used to select excitation frequencies, and the selected excitation frequencies may be used to inspect the structure.

Figure 1:
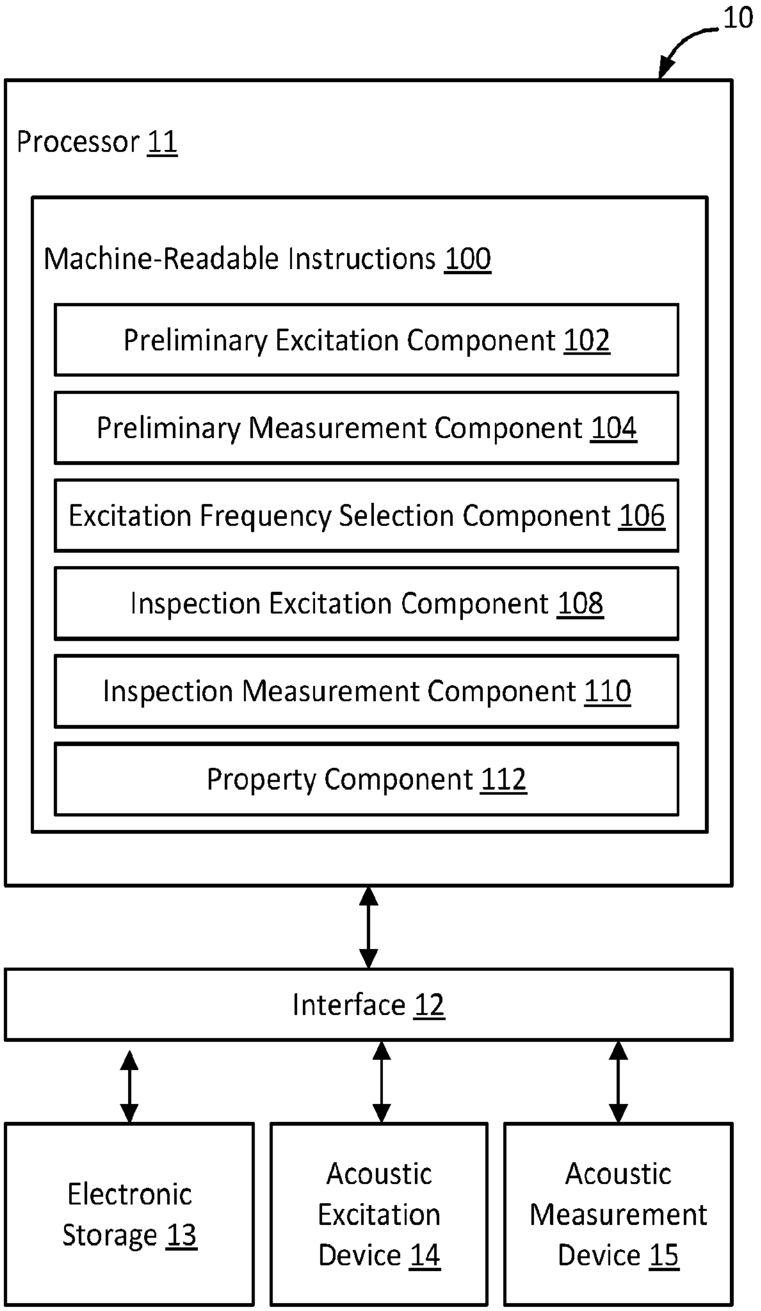
FIG. 1 illustrates an example system for inspecting a structure.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, an acoustic excitation device 14, an acoustic measurement device 15, and/or other components. Preliminary acoustic excitations may be generated in a structure using multiple excitation frequencies. Measurements of the preliminary acoustic excitations in the structure may be obtained by the processor 11. A subset of the multiple excitation frequencies may be selected by the processor 11 to be used to inspect the structure based on the measurements of the preliminary acoustic excitations in the structure and/or other information. Inspection acoustic excitations may be generated in the structure using the subset of the multiple excitation frequencies. Measurements of the inspection acoustic excitations in the structure may be obtained by the processor 11. One or more properties of the structure may be determined by the processor 11 based on the measurements of the inspection acoustic excitations in the structure and/or other information.

The acoustic excitation device 14 may refer to a device that generates acoustic excitation in a structure. Acoustic excitation of a structure may refer to application of energy to the structure to generate acoustic responses in the structure. An acoustic response may refer to presence of and/or propagation of one or more mechanical waves within the structure. That is, the structure may be acoustically excited to produce mechanical wave(s) within the structure. A mechanical wave may include a wave within the audible range and/or a wave above the audible range.

The acoustic excitation device 14 may apply energy to the structure to generate acoustic excitation in the structure mechanically (e.g., using one or more transducers), thermally (e.g., using one or more lasers), and/or by other ways. For example, energy (e.g., in form of sound, heat, ultrasound, vibration) may be applied to the structure through one or more transducers coupled to the structure, one or more pulse lasers, and/or other acoustic excitation devices. For instance, a guided-waves may be generated in a plate-like structure in response to ultrasonic excitation. The ultrasonic excitation/guided waves may be sensitive to different properties of the structures. For example, the ultrasonic excitation/guided waves may be sensitive to defects (e.g., damage) in the structure, which may change the characteristics of the ultrasonic excitation/guided waves where defects are located in the structure.

The acoustic excitation device 14 may be configured to generate acoustic excitations in the structure. The acoustic excitation device 14 may be configured to generate acoustic excitations in the structure for different purposes. The acoustic excitation device 14 may be configured to generate preliminary acoustic excitations in the structure, inspection acoustic excitations in the structure, and/or other acoustic excitations in the structure.

Preliminary acoustic excitations in the structure may refer to acoustic excitations that are generated to test acoustic excitations using different excitation frequencies. The preliminary acoustic excitations may be generated in the structure using multiple (separate, different) excitation frequencies, and measurements of these preliminary acoustic excitations in the structure may be used to select particular excitation frequencies for use in inspecting the structure. For example, the preliminary acoustic excitations may be generated by sweeping over a range of excitation frequencies, and the measurements of these preliminary acoustic excitations in the structure may be used to identify a subset of the tested excitation frequencies for use in more comprehensive inspection of the structure.

Inspection acoustic excitations in the structure may refer to acoustic excitations that are generated to inspect the structure. The inspection acoustic excitations may be generated in the structure using a subset of the multiple excitation frequencies used in the preliminary acoustic excitations. For example, a subset of the tested excitation frequencies may be selected based on their effectiveness in generating preliminary acoustic excitations in the structure, and the most effective (e.g., optimal) subset of the tested excitation frequencies may be used to generate the inspection acoustic excitations in the structure.

The acoustic excitation device 14 may be configured to generate acoustic excitations in the structure using a single excitation frequency at a time or using multiple excitation frequencies at once. For example, the acoustic excitation device 14 may be configured to generate acoustic excitations in the structure using 10 different excitation frequencies. The acoustic excitation device 14 may generate acoustic excitations using a single excitation frequency at a time (start generation of the acoustic excitations in the structure using an excitation frequency, stop generation of the acoustic excitations in the structure using the excitation frequency, start generation of the acoustic excitations in the structure using a different excitation frequency, and so forth). The acoustic excitation device 14 may generate acoustic excitations using multiple excitation frequencies at the same time (e.g., generate acoustic excitations in the structure using all of the excitation frequencies at once, generate acoustic excitations in the structure using two or more of the excitation frequencies at once). In some implementations, the number of excitation frequencies that are used to generate acoustic excitations in the structure may depend on the maximum power output of the acoustic excitation device 14. For example, generating acoustic excitation in the structure using multiple excitation frequencies at once may require the power of the acoustic excitation device 14 to be shared across the multiple excitation frequencies. Generating acoustic excitation in the structure using multiple excitation frequencies at once may require a tradeoff between inspection time and signal level.

The acoustic measurement device 15 may refer to a device that measures acoustic excitation in a structure. The acoustic measurement device 15 may refer to a device that measures acoustic responses (e.g., velocity responses) in the structure. For example, the structure may be acoustically excited by the acoustic excitation device 14 to produce mechanical wave(s) within the structure, and the acoustic measurement device 15 may measure one or more characteristics of the mechanical wave(s) within the structure, and/or one or more characteristics of the structure that reflects (e.g., indicates, is impacted by) the mechanical wave(s) within the structure.

The acoustic measurement device 15 may measure the acoustic excitation in the structure mechanically (e.g., using one or more transducers), optically (e.g., using a scanning laser), and/or by other ways. For example, acoustic excitation in the structure may be measured through one or more transducers coupled to the structure, scanning laser Doppler vibrometer, and/or other acoustic measurement devices. For example, the acoustic measurement device 15 may measure acoustic responses (e.g., full-field surface velocity response) in the structure. An acoustic response may include a vibrational/wave response (e.g., full-wavefield response) in the audible range and/or above the audible range (ultrasonic response).

In some implementations, the acoustic measurement device 15 may include a vibrometer. The vibrometer may include one or more vibrographs and/or other devices that measure the amplitude, velocity, and/or frequency of vibrations in a structure. In some implementations, the vibrometer may measure acoustic responses using one or more beams. For example, the vibrometer may include one or more laser Doppler vibrometers that uses a laser beam to measure acoustic responses in different portions of the structures. The acoustic responses may include the vibration/wave amplitude, velocity, and/or frequency within the structure. A scan path may refer to a path traced and/or followed by the beam(s) of the vibrometer along the structure to make the measurements. In some implementations, the vibrometer may use a raster scan to make the measurements.

The acoustic measurement device 15 may be configured to measure the acoustic excitations in the structure. The acoustic measurement device 15 may be configured to measure the acoustic excitations in the structure for different purposes. The acoustic measurement device(s) may be configured to measure the preliminary acoustic excitations in the structure, the inspection acoustic excitations in the structure, and/or acoustic excitations in the structure.

The acoustic measurement device 15 may be configured to measure the preliminary acoustic excitations in the structure and the inspection acoustic excitations in the structure the same way or differently. For example, acoustic measurement device 15 may make partial measurements of the preliminary acoustic excitations in the structure and may make full measurements of the inspection acoustic excitations in the structure. Partial measurement of acoustic excitations in the structure may be less comprehensive than full measurement of acoustic excitations in the structure. Partial measurement of acoustic excitations in the structure may include incomplete measurement of acoustic excitations in the structure, while full measurement of acoustic excitations in the structure may include complete measurement of acoustic excitations in the structure. For example, partial measurement of acoustic excitations in the structure may include measurement at smaller number of points and/or smaller area than full measurement of acoustic excitations in the structure. Partial measurement of acoustic excitations in the structure may include sampling of particular portions of the structure, with the goal of determining how much (e.g., how efficiently) the different portions of the structure have been acoustically excited using different excitation frequencies. Full measurement of acoustic excitations in the structure may include measurement across the structure, with the goal of inspecting properties of the structure using the measured acoustic excitations (with the acoustic excitations performed using the selected excitation frequencies).

In some implementations, one or more components of the system 10 may be separate from the system 10. For example, the acoustic excitation device 14 and/or the acoustic measurement device 15 may be separate from the system 10 and may be controlled by one or more processors separate from the processor 11. While the components of the system 10 are shown as single components, this is merely as an example and is not meant to be limiting.

A structure may refer to arrangement and/or organization of one or more things. Thing(s) may be arranged and/or organized into a structure to perform one or more functions. A structure may be composed of a particular type of matter or a combination of different types of matter. For example, a structure may include a metallic, rigid structure and/or other structure. A structure may have a symmetrical shape or an asymmetrical shape. A structure may include one or more simple geometric shapes, one or more arbitrarily complex geometric shapes, and/or other geometric shapes.

In some implementations, a structure may include a hollow structure, a support structure, a moving structure, and/or other structure. A hollow structure may refer to a structure that includes one or more empty spaces within the structure. The empty space(s) may be used to hold, carry, transport, and/or otherwise interact with one or more things. For example, a hollow structure may include a vehicle, a container, a pipe, and/or other hollow structure. A support structure may refer to a structure that provides support for one or more things. For example, a support structure may include an installation, a platform, a frame, a crane, a beam, and/or other support structure. A moving structure may refer to a structure that moves to perform its function. For example, a moving structure may include a turbine blade and/or other moving structure. Non-limiting examples of structures include one or more parts or entirety of offshore floating production installations (such as spars, semisubmersibles, tension leg platforms), ship/barge hulls, offshore mobile drilling units, aircrafts, space launch vehicles, wind turbine blades, pressure vessels, piping systems, ballast tanks, void tanks, and cargo tanks. Other types of structures are contemplated.

Structures may be inspected to ensure that they are capable of performing their functions. For example, a structure may be inspected to determine whether the structure has developed any defects, such as material addition (e.g., material sticking), material loss (e.g., corrosion, chipping, pitting), material cracking (e.g., in-plane cracking, out-of-plane cracking), and/or other defects.

Different properties of the structure (e.g., arrangements/organizations of matter in the structure) may cause different responses to acoustic excitation of the structure (e.g., result in different acoustic excitation of the structure). For example, a particular type of defect in a structure may cause a particular type of acoustic response in the corresponding part of the structure to acoustic excitation of the structure. Measurement of acoustic excitation (e.g., velocity response) in the structure may be used to determine the properties of the structure.

In some implementations, a structure may refer to a portion of a larger structure. For example, a structure may refer to a region of interest of a larger structure. That is, rather than inspecting the entire structure, a particular portion of the structure may be inspected.

Steady state wavefield measurement of a structure may be used to identify defects in the structure. However, such inspection of the structure may be unable to identify defects that are smaller than the order of the wavelength used. For example, wavenumber estimation of guided ultrasonic waves may be used to identify area spanning defects, but it may be unable to identify defects that are smaller than the order of the wavelength, such as cracks or small dents. This is because the defects themselves only have part of the waveform in them, which makes properly estimating the waveform infeasible.

Transient wavefield measurement of the structure may be used to identify such small defects, but transient wavefield measurement of the structure may be time-consuming. Individual transient wavefield measurements may need to wait for a wave to propagate through the structure to the measurement point, and then for the wave to dissipate. Repeating cycles of wave propagation and dissipation for different measurement points may make transient wavefield measurements slow. Transient wavefield measurements may also require repeated measurement at the same point to reduce noise, further slowing the measurement.

The present disclosure utilizes steady state wavefield measurements from multiple excitation frequencies to determine properties of the structure. For example, the steady state wavefield measurements from multiple excitation frequencies (e.g., magnitude of the complex velocity data from multiple excitation frequencies) may be used to generate a damage map of the structure, which may indicate locations and/or types of defects in the structure. Steady state wavefield measurements from different excitation frequencies may be combined to generate the damage map.

Use of steady state wavefield measurements allows for fast inspection of the structure (faster than transient wavefield measurements). Use of multiple excitation frequencies allows for the structure to be probed/inspected with different wavelengths, allowing for different size of defects to be explored. Additionally, use of steady state wavefield measurements may result in higher signal to noise ratio than transient wavefield measurements as higher amount of energy may be present within the structure to perform the inspection.

Specific excitation frequencies may be selected to perform the steady state wavefield measurements of the structure. To do so, different excitation frequencies may be tested on the structure to identify those frequencies that are effective at generating response in the structure. Different frequencies may cause different acoustic responses in the structure. That is, different acoustic excitation may occur in the structure with different excitation frequencies. A subset of the tested frequencies (e.g., frequencies that produced the best/most response) may be selected for detailed multi-frequency steady state wavefield measurements of the structure. Multi-frequency state wavefield measurements of the structure may take advantage of the differences in the responses of the defects with varying geometries to different excitation frequencies. For example, those excitation frequencies that generate the most energetic response in the structure may be used to take detailed multi-frequency steady state wavefield measurements of the structure. Using multiple excitation frequencies may increase the amount of information present in the damage map, and may allow for determination (e.g., identification, classification, quantification) of defects that are not visible using typical wavenumber estimation of steady state wavefield measurements.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to a structure, preliminary acoustic excitations in a structure, selection of excitation frequencies, inspection acoustic excitations in a structure, properties of a structure, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate inspecting a structure. The machine-readable instructions 100 may include one or more computer program components. The machine-readable instructions 100 may include one or more of a preliminary excitation component 102, a preliminary measurement component 104, an excitation frequency selection component 106, an inspection excitation component 108, an inspection measurement component 110, a property component 112, and/or other computer program components.

The preliminary excitation component 102 may be configured to generate preliminary acoustic excitations in the structure. The preliminary acoustic excitations may be generated in the structure using the acoustic excitation device 14 and/or other acoustic excitation device(s). The preliminary acoustic excitations may be generated in the structure using multiple excitation frequencies. The preliminary acoustic excitations may be generated in the structure to test response of the structure to different excitation frequencies. The preliminary acoustic excitations may be generated in the structure using a single excitation frequency at a time or using multiple excitation frequencies at once. The preliminary acoustic excitations in the structure may include preliminary steady state acoustic excitations in the structure. That is, the steady state acoustic excitations may be generated in the structure to test steady state response of the structure to the different excitation frequencies. The excitation frequencies may include one or more ultrasonic frequencies and/or one or more non-ultrasonic frequencies.

The multiple excitation frequencies that are used to generate the preliminary acoustic excitations in the structure may be selected manually and/or automatically. For example, particular excitation frequencies may be manually selected by one or more users for use in generating the preliminary acoustic excitations in the structure. As another example, particular excitation frequencies may be automatically selected by the preliminary excitation component 102 based on defaults, the type of structure to be inspected (e.g., geometry of the structure, material that make up the structure), the type of properties to be determined (e.g., types of defects to be determined), and/or other information.

Selection of particular excitation frequencies to be used to generate the preliminary acoustic excitations in the structure may include selection of specific excitation frequencies and/or selection of a range of excitation frequencies to be used, along with increment(s) of frequencies to be used. For example, a user may specify specific values of excitation frequencies to be used to generate the preliminary acoustic excitations in the structure. As another example, a user may specify a range of excitation frequencies to be swept over (e.g., from 30 KHz to 120 kHz), along with the increment by which the excitation frequencies are to be changed (e.g., increment/decrement by 50 Hz). In some implementations, the range of excitation frequencies to be tested and the increment by which the excitation frequencies are to be changed may depend on the type of the structure to be inspected. Selection of other excitation frequencies for generation of the preliminary acoustic excitations in the structure is contemplated.

The preliminary measurement component 104 may be configured to obtain measurements of the preliminary acoustic excitations in the structure. Obtaining measurements of the preliminary acoustic excitations in the structure may include one or more of accessing, acquiring, analyzing, determining, examining, identifying, generating, loading, locating, making, opening, receiving, retrieving, reviewing, selecting, storing, taking, and/or otherwise obtaining the measurements of the preliminary acoustic excitations in the structure. The measurements of the preliminary acoustic excitations in the structure may be obtained using the acoustic measurement device 15 and/or other acoustic measurement device(s). The measurements of the preliminary acoustic excitations in the structure may be obtained from the acoustic measurement device 15, other acoustic measurement device(s), and/or other location. For example, the acoustic measurement device 15 may generate information that characterizes, defines, identifies, and/or reflects the measured preliminary acoustic excitations in the structure, and the information may be obtained directly from the acoustic measurement device 15 and/or indirectly from the acoustic measurement device 15 (e.g., from electronic storage of the acoustic measurement device 15). In some implementations, the measurements of the preliminary acoustic excitations in the structure may include measurements of velocity responses in the structure. The preliminary measurement component 104 may obtain measurements of velocity responses in the structure due to the preliminary acoustic excitations. In some implementations, the measurements of velocity responses in the structure may be obtained as a raw wavefield image, with the magnitudes of the raw wavefield image reflecting the types and/or amounts of the velocity response. Other measurements of the preliminary acoustic excitations in the structure are contemplated.

In some implementations, the measurements of the preliminary acoustic excitations in the structure may include partial measurements of the preliminary acoustic excitations in the structure. Partial measurements of the preliminary acoustic excitations in the structure may include less comprehensive measurements than full measurements. Partial measurements of the preliminary acoustic excitations in the structure may include incomplete measurement of the preliminary acoustic excitations in the structure. Partial measurements of the preliminary acoustic excitations in the structure may include measurements at smaller number of points and/or smaller area of the structure than full measurements of acoustic excitations in the structure. Partial measurements of the preliminary acoustic excitations in the structure may include sampling of particular portions of the structure, with the goal of determining how much (e.g., how efficiently) the different portions of the structure have been acoustically excited using different excitation frequencies.

In some implementations, number and/or locations at which measurements are made may be determined manually and/or automatically. For example, number and/or locations at which measurements are made may be manually selected by one or more users. As another example, number and/or locations at which measurements are made may be automatically selected by the preliminary measurement component 104 based on defaults, the type of structure to be inspected (e.g., geometry of the structure, material that make up the structure), the type of properties to be determined (e.g., types of defects to be determined), and/or other information.

In some implementations, number and/or locations at which measurements are made may be determined randomly. In some implementations, number and/or locations at which measurements are made may be determined using one or more scan lines (e.g., vertical scan lines, horizontal scan lines, diagonal scan lines). In some implementations, the direction in which the structure is scanned may be selected to increase measurement speed.

The excitation frequency selection component 106 may be configured to select a subset of the multiple excitation frequencies. Selecting a subset of the multiple excitation frequencies may include ascertaining, choosing, determining, establishing, finding, identifying, obtaining, setting, and/or otherwise selecting the subset of the multiple excitation frequencies. A subset of the multiple excitation frequencies (used in preliminary acoustic excitations) may include less than all of the multiple excitation frequencies. The subset of the multiple excitation frequencies may be selected to be used to inspect the structure. The excitation frequency selection component 106 may select some of the excitation frequencies that were used to generate preliminary acoustic excitations in the structure. The excitation frequencies may be selected for use in generating inspection acoustic excitations in the structure.

The subset of the multiple excitation frequencies may be selected based on the measurements of the preliminary acoustic excitations in the structure and/or other information. The measurements of the preliminary acoustic excitations in the structure may be used to determine which ones of the multiple excitation frequencies that were used to generate preliminary acoustic excitations in the structure will be used to generate inspection acoustic excitations in the structure. Different excitation frequencies may cause different types and/or amounts of acoustic excitations to occur in the structure. That is, the type and/or amount acoustic response in the structure may depend on the excitation frequency used to perform the acoustic excitation. Measurements of the preliminary acoustic excitations in the structure may be used to identify the responsiveness of the structure to different excitation frequencies, and the responsiveness of the structure to different excitation frequencies may be used to select the excitation frequencies. For example, measurements of the preliminary acoustic excitations in the structure may be used to determine the excitation frequencies at which the structure is most responsive (e.g., ranking of excitation frequencies by the types and/or amounts of acoustic excitations in the structure), and the excitation frequency selection component 106 may select the excitation frequencies that generate the most response in the structure. For instance, the excitation frequency selection component 106 may select ten excitation frequencies that generate the highest response in the structure. Selection of other number of excitation frequencies are contemplated.

In some implementations, number of excitation frequencies that are selected may be determined manually and/or automatically. For example, number of excitation frequencies that are selected may be manually selected by one or more users. As another example, number of excitation frequencies that are selected may be automatically selected by the excitation frequency selection component 106 based on defaults, the type of structure to be inspected (e.g., geometry of the structure, material that make up the structure), the type of properties to be determined (e.g., types of defects to be determined), and/or other information. The number of excitation frequencies that are selected may involve a tradeoff between accuracy/preciseness of the inspection and the amount of time it takes to perform the inspection. Larger number of frequencies that are selected may result in higher accuracy/preciseness of the inspection at the cost of longer inspection time, while smaller number of frequencies that are selected may result in lower accuracy/preciseness of the inspection while allowing the inspection to be performed more rapidly.

In some implementations, selection of the subset of the multiple excitation frequencies to be used to inspect the structure, based on the measurements of the preliminary acoustic excitations in the structure, may include selection of the subset of the multiple excitation frequencies based on a measure of signal quality of the measurements of the preliminary acoustic excitations in the structure. A measure of signal quality of the measurements of the preliminary acoustic excitations in the structure may refer to a measure of quality of information conveyed by the measurements of the preliminary acoustic excitations in the structure. For example, a measure of signal quality of the measurements of the preliminary acoustic excitations in the structure may be determined based on summary statistic (e.g., mean and/or standard deviation) of the velocity responses in the structure. For instance, the measurements of the preliminary acoustic excitations in the structure may include measurements of vibrational velocity at different locations of the structure. The magnitude of the vibrational velocity at a location may provide a measure of energy at the location. The mean and/or standard deviation of the vibrational velocity measured from the preliminary acoustic excitations in the structure may be used to determine the excitation frequencies that produced the most response in the structure, and the excitation frequencies that produced the most response in the structure (e.g., top 10 excitation frequencies) may be selected. Use of other quality measure/summary statistic are contemplated.

The inspection excitation component 108 may be configured to generate inspection acoustic excitations in the structure. The inspection acoustic excitations may be generated in the structure using the acoustic excitation device 14 and/or other acoustic excitation device(s). The inspection acoustic excitations may be generated in the structure using the subset of the multiple excitation frequencies. That is, the inspection acoustic excitations may be generated in the structure using some of the excitation frequencies used to generate the preliminary acoustic excitations in the structure. The inspection acoustic excitations may be generated in the structure using the excitation frequencies (e.g., optimal excitation frequencies) selected by the excitation frequency selection component 106. The inspection acoustic excitations may be generated in the structure to perform inspection of the structure.

The inspection acoustic excitations may be generated in the structure using a single excitation frequency at a time or using multiple excitation frequencies at once. The inspection acoustic excitations in the structure may include inspection steady state acoustic excitations in the structure. That is, the steady state acoustic excitations may be generated in the structure to inspect the structure using the steady state response of the structure to the selected excitation frequencies. The excitation frequencies may include one or more ultrasonic frequencies and/or one or more non-ultrasonic frequencies. For example, acoustic excitation device(s) may be used to create a steady-state, multi-tone, ultrasonic excitation of the structure and ultrasonic responses in different portions of the structure may be measured and used to determine properties of the structure at corresponding portions. Use of the steady-state, multi-tone, ultrasonic excitation may enable ultrasonic response measurement to be performed quickly (e.g., scanning areas of a square-meter or more in seconds), without need for repetition, and from a large distance (e.g., tens of meters away). Other inspection acoustic excitations of the structure are contemplated.

The inspection measurement component 110 may be configured to obtain measurements of the inspection acoustic excitations in the structure. Obtaining measurements of the inspection acoustic excitations in the structure may include one or more of accessing, acquiring, analyzing, determining, examining, identifying, generating, loading, locating, making, opening, receiving, retrieving, reviewing, selecting, storing, taking, and/or otherwise obtaining the measurements of the inspection acoustic excitations in the structure. The measurements of the inspection acoustic excitations in the structure may be obtained using the acoustic measurement device 15 and/or other acoustic measurement device(s). The measurements of the inspection acoustic excitations in the structure may be obtained from the acoustic measurement device 15, other acoustic measurement device(s), and/or other location.

For example, the acoustic measurement device 15 may generate information that characterizes, defines, identifies, and/or reflects the measured inspection acoustic excitations in the structure, and the information may be obtained directly from the acoustic measurement device 15 and/or indirectly from the acoustic measurement device 15 (e.g., from electronic storage of the acoustic measurement device 15). In some implementations, the measurements of the inspection acoustic excitations in the structure may include measurements of velocity responses in the structure. The inspection measurement component 110 may obtain measurements of velocity responses in the structure due to the inspection acoustic excitations. In some implementations, the measurements of velocity responses in the structure may be obtained as a raw wavefield image, with the magnitudes of the raw wavefield image reflecting the types and/or amounts of the velocity response. Other measurements of the inspection acoustic excitations in the structure are contemplated.

In some implementations, the measurements of the inspection acoustic excitations in the structure may include full measurements of the inspection acoustic excitations in the structure. Full measurements of the inspection acoustic excitations in the structure may include more comprehensive measurements than partial measurements. Full measurements of the inspection acoustic excitations in the structure may include complete measurement of the inspection acoustic excitations in the structure. Full measurements of the inspection acoustic excitations in the structure may include measurements at larger number of points and/or larger area of the structure than partial measurements of acoustic excitations in the structure. Full measurements of the inspection acoustic excitations in the structure may include sampling of different portions of the structure, with the goal of determining how much (e.g., how efficiently) the different portions of the structure have been acoustically excited using the selected excitation frequencies. For instance, rather than probing the acoustic excitations at a select number of points, the acoustic excitations across the entirety of the structure may be measured to produce a full wavefield measurement that shows the acoustic response of the entire structure/region of interest. The full wavefield measurement may be used to identify (e.g., visualize) defects in the structure/region of interest.

The property component 112 may be configured to determine one or more properties of the structure. A property of a structure may refer to a physical attribute, quality, and/or characteristic of the structure. For example, a property of a structure may refer to one or more defects in the structure, thickness of the structure, arrangement of materials within the structure, and/or types of materials that makeup the structure. A defect in the structure may include material addition (e.g., material sticking), material loss (e.g., corrosion, chipping), material cracking (e.g., in-plane cracking, out-of-plane cracking), and/or other defects. Other types of defects and properties of structures are contemplated.

Determination of a property of a structure may include identification of the property, quantification of the property, and/or other determination of the property of the structure. For example, the property component 112 may determine thickness of different portions of the structure, may determine the existence and/or absence of one or more defects in the structure, may identify the type of defect in the structure, may quantify (e.g., provide numbers that define) the defect in the structure, and/or provide other determination of the property of the structures.

The propert(ies) of the structure may be determined by the property component 112 based on the measurements of the inspection acoustic excitations in the structure and/or other information. The acoustic response of the structure to the excitation frequencies (selected by the excitation frequency selection component 106) may be used to determine the propert(ies) of the structure. The amount and/or type of the inspection acoustic excitations measured in the structure may be used to determine the propert(ies) of the structure. For example, the property component 112 may use the amount and/or type of inspection acoustic excitations in a particular portion of the structure to determine the propert (ies) of the particular portion of the structure. In some implementations, the geometry (e.g., the shape of the excitations, the focal point of the excitations, the breadth of the excitations) may be used to determine geometric information about the propert(ies) of structure (e.g., size/shape of defect).

For example, the amplitude of velocity response in the structure may indicate the type (e.g., material addition, material loss, material cracking) and/or size (e.g., width, depth) of defect in the structure. The amplitude profile of velocity response through the structure may be used to determine the location, shape, and/or the size of defect in the structure. Use of the velocity response in the structure to determine defects in the structure may enable identification and/or quantification of defects that are hidden from view (e.g., defects under the surface of the structure, covered defects).

In some implementations, determination of the propert (ies) of the structure, based on the measurements of the inspection acoustic excitations in the structure, may include: (1) generation of one or more damage maps of the structure based on the measurements of the inspection acoustic excitations in the structure, and (2) determination of the propert (ies) of the structure based on the damage map(s) and/or other information. In some implementations, the damage map(s) may be presented within one or more graphical user interfaces. In some implementations, the damage map(s) may be presented on one or more display.

A damage map may refer to an image that visually represents defects in a structure. A damage map may refer to an image that visually represents different characteristics of the structure. For example, a damage map may visually represent different acoustic responses in a structure using different values of pixels (e.g., different colors, different intensities).

In some implementations, the damage map(s) may be generated based on filtering the measurements of the inspection acoustic excitations in the structure and/or other information. For example, the measurements of the inspection acoustic excitations in the structure may be obtained as a heat map that represents different acoustic responses (e.g., velocity responses) using different pixel characteristics, and a damage map may be generated by filtering the heat map. In some implementations, filtering may reduce the number of excitation frequencies that are needed to be used to produce an accurate damage map. Filtering may increase the signal-to-noise ratio in the measurements of the inspection acoustic excitations in the structure.

For example, measurements of the inspection acoustic excitations in the structure for an excitation frequency may include time series data, and the time series data may be divided into segments that correspond to pixels in a measured grid. The segments may be dotted with complex exponential of the excitation frequency, resulting in a single complex-valued velocity response (amplitude and phase) for each pixel.

One or more filters may be used to improve the information contained in the heat map. For example, a bandpass filter may be used to preserve the information near the primary spatial frequency while reducing other information as noise. For example, a bandpass filter may cut out frequencies that are too high or too low, while retaining the primary vibrations of the structure (along with surrounding frequencies). Use of the filter may smooth the heat map to generate the damage map, resulting in features of the heat map becoming more visible in the damage map. The filter may remove the dominant wave frequency component from the measurement and make other components of the measurement more visible. In some implementations, the dominant wave frequency component of the measurement may be determined by converting the heat map to the wavenumber domain and identifying the maximum in the wavenumber domain.

In some implementations, the bandpass filter may be set slightly higher than the main structural mode. Such a bandpass filter may allow for detection of small defects that increase the wavenumber (shifting of energy from the main mode). Defects in the structure may be found from the damage map by looking for locations in which there is aggregation of energy that is not at the main frequency/wavenumber of the portions without defect. The damage map may allow for identification of changes in wavenumber without performing wavenumber estimation.

Figure 3:
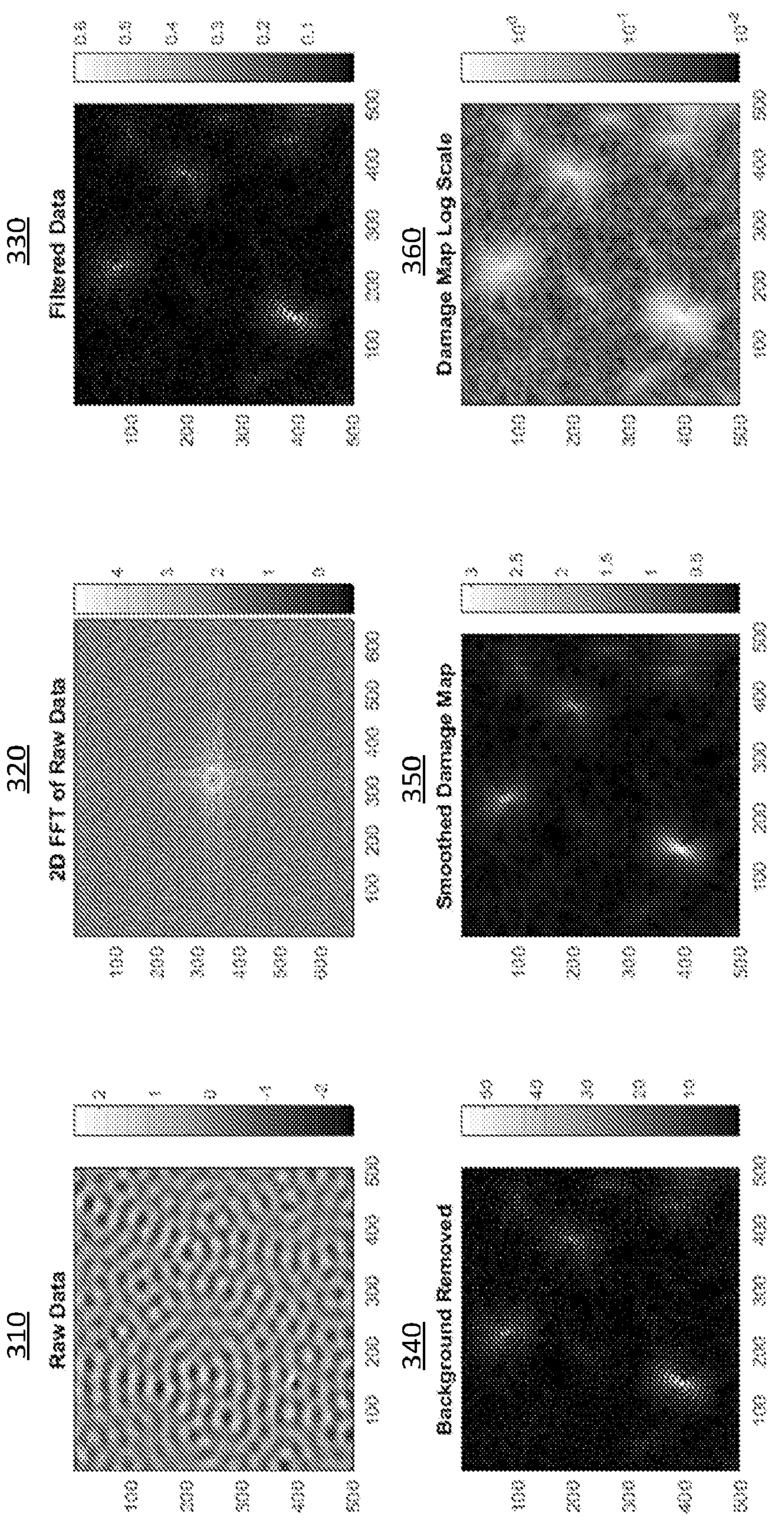
FIG. 3 illustrates example processing of a damage map.

For example, FIG. 3 illustrates example processing of a damage map. In FIG. 3, raw data 310 may show the measurements of the inspection acoustic excitations in the structure using a heat map. The color/intensity of the heat map may reflect the amplitude of the velocity response at different locations in the structure. 2D FFT of raw data 320 shows the raw data 310 convert into the wavenumber domain. As shown in the 2D FFT of raw data 320, the circle indicates the primary mode at which the structure is vibrating. The raw data 320 may be filtered to generate the filtered data 330. The filtered data 330 may be used as a damage map for the structure. Certain features of the structure (e.g., rippling features), that are not visible in the raw data 310, are visible in the filtered data 330.

In some implementation, background signal generated by the excitation mechanism may be removed. In FIG. 3, background signal may be removed from the filtered data 330 to generate the background removed data 340. For example, the excitation mechanism may introduce noise into the acoustic excitation, which may be removed. For instance, a transducer attached to a particular location in the structure may create uneven acoustic excitation in the structure (e.g., energy of the acoustic response being higher towards the location at which the transducer is attached). That is, the energy may be unevenly introduced into the structure. The background removal may include removal of the distortion in acoustic excitation caused by the unevenly introduced energy. In some implementations, the background signal in the data may be identified as values having less than a certain percentage (e.g., 5%) of the highest-valued pixel. A plane may be fit to the background pixels, such as using linear least squares, and the entire magnitude image may be divided by the fitted plane.

In some implementation, the data may be smoothed. For example, in FIG. 3, the background removed data 340 may be smoothed to generate smoothed data 350. Smoothing may remove artifacts from the data. For example, ripples may be introduced into the data (shown in the filtered data 330 and background removed data 340) from filtering of the data. One or more smoothing kernels may be used to remove the ripples from the data, which may make features easier to identify.

In some implementations, the data may be analyzed and/or presented using a log scale. Log scale may make features of the data more evident. For example, in FIG. 3, the smoothed data 350 may be presented as log scale data 360. Defects in the structure (locations in which response is high) may be easier to identify in the log scale data 360 than in the smoothed data 350.

The damage maps from different excitation frequencies may be combined together to generate a combined damage map. For example, the values of the damage maps from different excitation frequencies may be added together to generate the combined damage map. In some implementations, the values of the damage maps from different excitations frequencies may be weighed equally (a response from one excitation frequency weighed same as a response from another excitation frequency). In some implementations, the values of the damage maps from different excitations frequencies may be weighed differently (e.g., a response from one excitation frequency weighed different than a response from another excitation frequency). The combined damage map may provide a more comprehensive view of the defects in the structure than individual damage maps.

Figure 4:
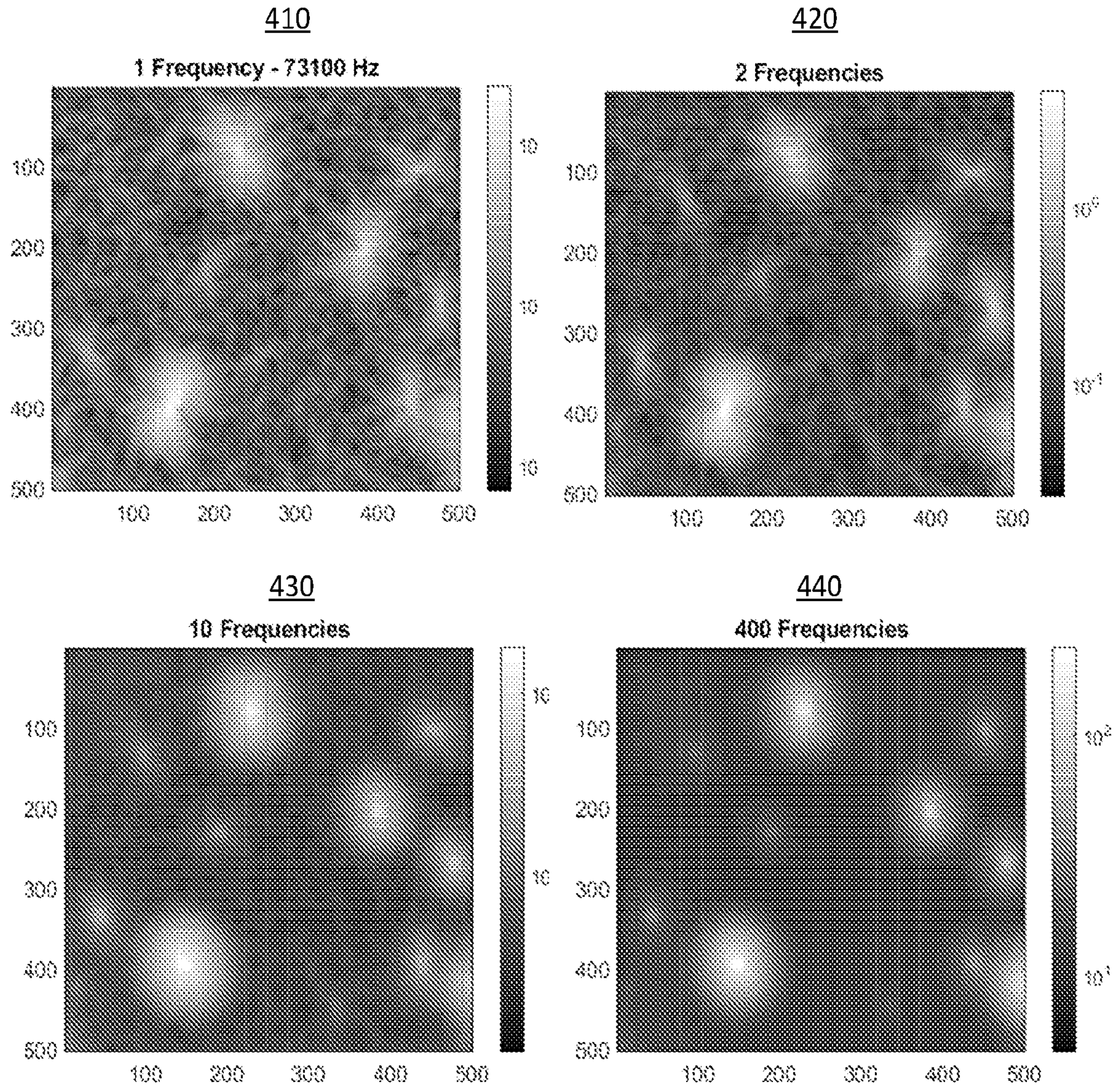
FIG. 4 illustrates example damage maps generated using different number of frequencies.

FIG. 4 illustrates example damage maps 410, 420, 430, 440 generated using different number of frequencies. The damage map 410 shows a log-scale view of a damage map generated using a single excitation frequency. The damage map 420 shows a log-scale view of a damage map generated by combining damage maps from two excitation frequencies. The damage map 430 shows a log-scale view of a damage map generated by combining damage maps from ten excitation frequencies. The damage map 440 shows a log-scale view of a damage map generated by combining damage maps from four-hundred excitation frequencies. As shown in FIG. 4, increasing the number of excitation frequencies used may increase the accuracy/preciseness of the damage map. However, increasing the number of excitation frequencies used may increase the amount of time required to perform the inspection.

Figure 5:
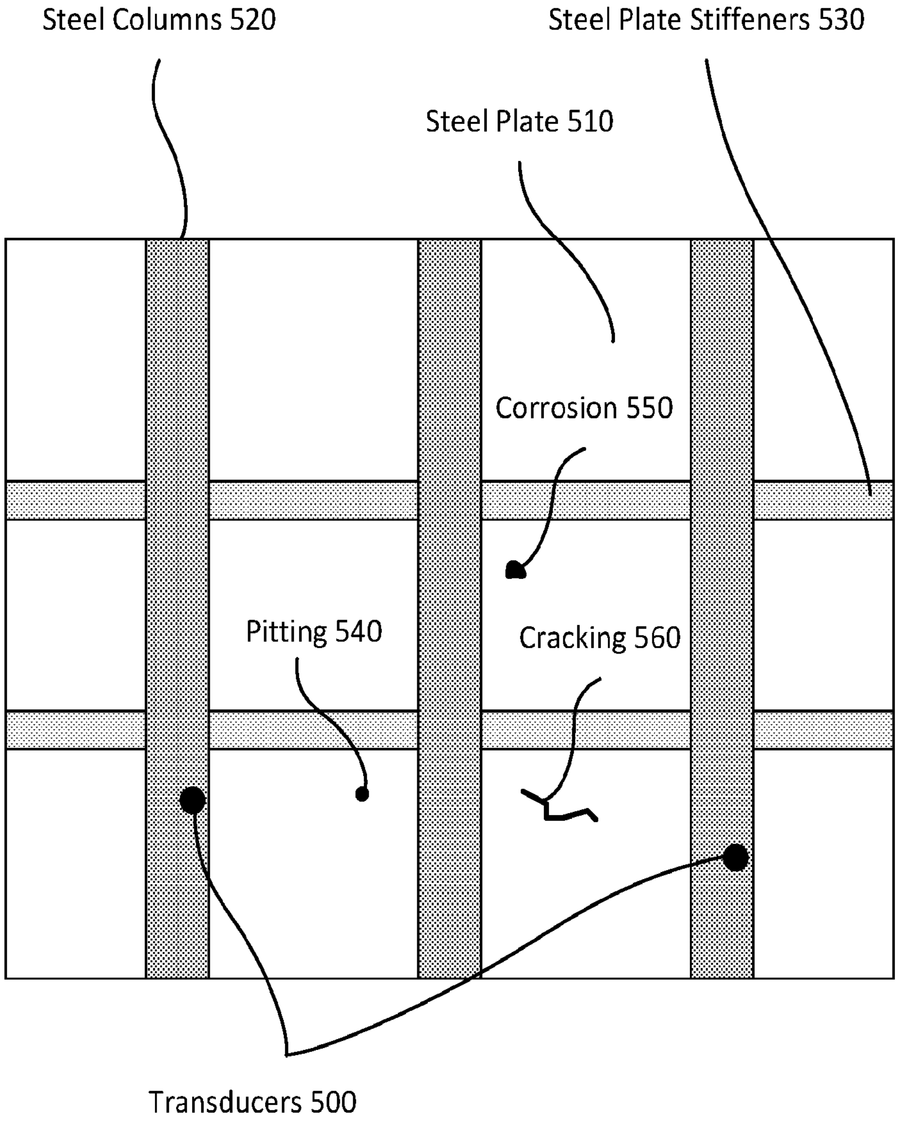
FIG. 5 illustrates example identification of defects in a structure.

FIG. 5 illustrates example identification of defects in a structure. The structure in FIG. 5 may include a steel plate 510, steel columns 520, and steel plate stiffeners 530. The structure may include the following defects: pitting 540, corrosion 550, and cracking 560. Transducers 500 may be attached to the steel columns 520 to generate acoustic excitations in the structure. Different excitation frequencies may be tested on the structure by generating and measuring acoustic excitation in the structure using different frequencies. The highest performing (e.g., optimal) excitation frequencies from the test may be used to excite the structure using steady state excitation, and acoustic excitations in the structure using these excitation frequencies may be measured (e.g., using laser Doppler vibrometer). The measurements may be used to identify the defects in the structure. For example, the measurements may be used to identify the location, the shape, the size, and/or the types of the following defects: the pitting 540, the corrosion 550, and the cracking 560.

Figure 6:
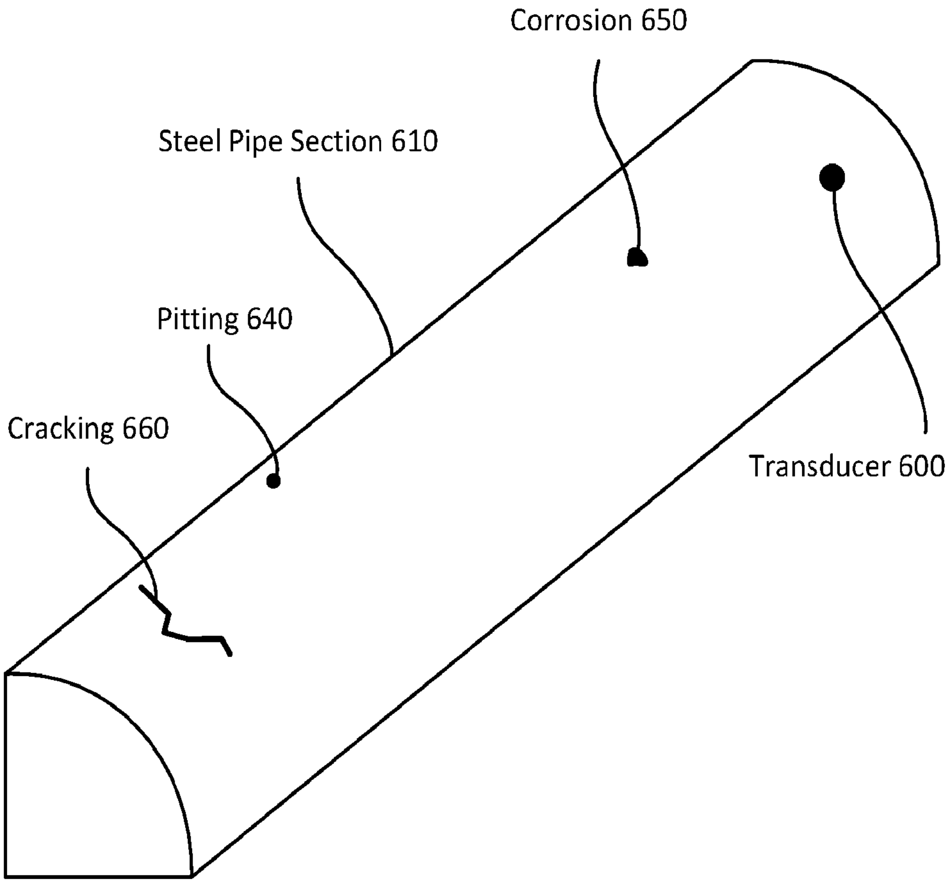
FIG. 6 illustrates example identification of defects in a structure.

FIG. 6 illustrates example identification of defects in a structure. The structure in FIG. 6 may include a steel pipe section 610. The structure may include the following defects: pitting 640, corrosion 650, and cracking 660. A transducer 600 may be attached to the steel pipe section 610 to generate acoustic excitations in the structure. Different excitation frequencies may be tested on the structure by generating and measuring acoustic excitation in the structure using different frequencies. The highest performing (e.g., optimal) excitation frequencies from the test may be used to excite the structure using steady state excitation, and acoustic excitations in the structure using these excitation frequencies may be measured (e.g., using laser Doppler vibrometer). The measurements may be used to identify the defects in the structure. For example, the measurements may be used to identify the location, the shape, the size, and/or the types of the following defects: the pitting 640, the corrosion 650, and the cracking 660. Inspection of other types of structures and other types of defects are contemplated.

Implementations of the disclosure may be made in hardware, firmware, software, or any suitable combination thereof. Aspects of the disclosure illustrated in FIG. 1 may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 in FIG. 1 may be provided by external resources not included in the system 10. External resources may include hosts/sources of information, computing, and/or processing and/or other providers of information, computing, and/or processing outside of the system 10.

Although the processor 11, the electronic storage 13, the acoustic excitation device 14, and the acoustic measurement device 15 are shown to be connected to the interface 12 in FIG. 1, any communication medium may be used to facilitate direct and/or indirect interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
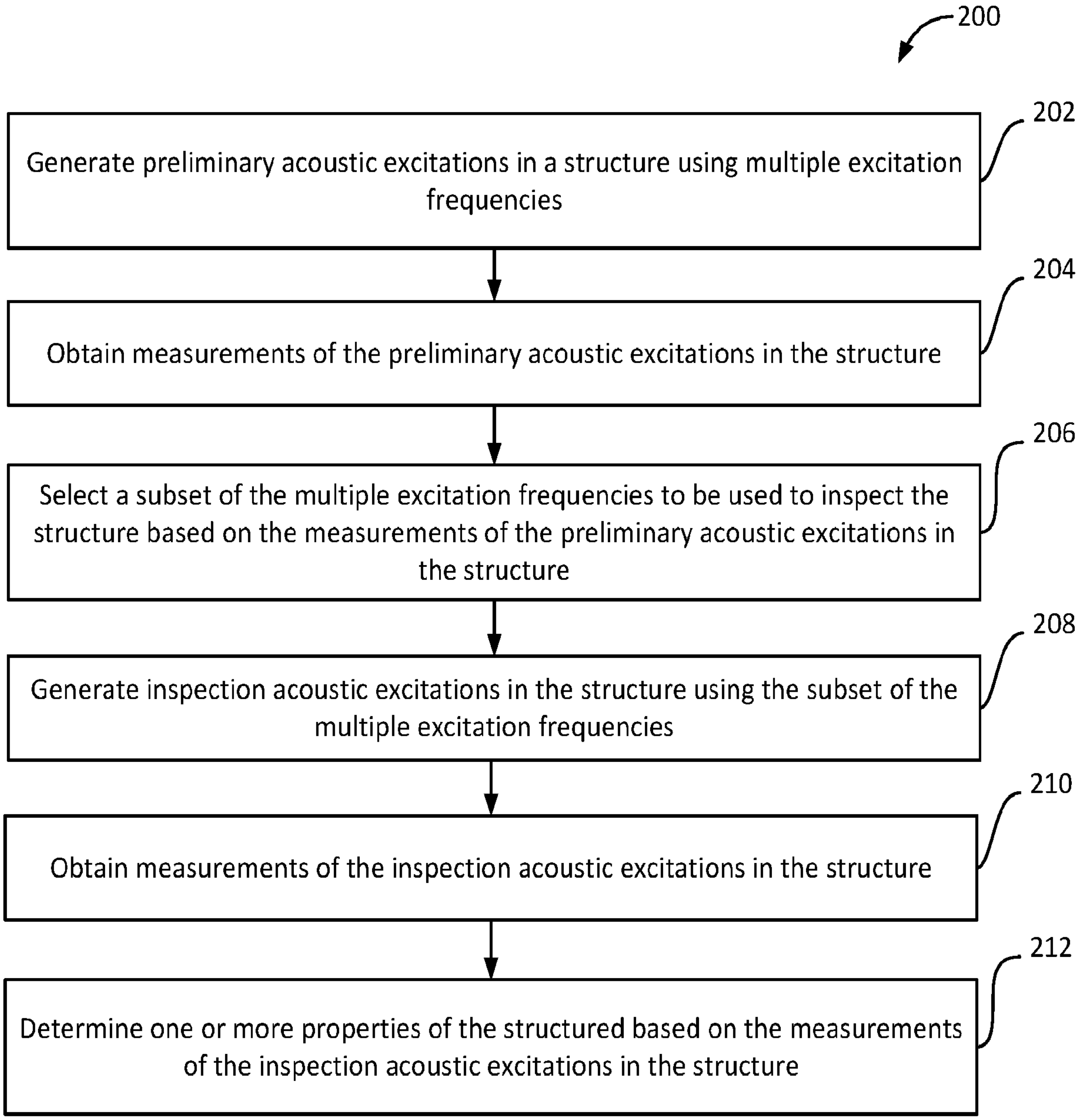
FIG. 2 illustrates an example method for inspecting a structure.

FIG. 2 illustrates method 200 for inspecting a structure. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, one or more operations of the method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, preliminary acoustic excitations may be generated in a structure using multiple excitation frequencies. In some implementations, operation 202 may be performed by a component the same as or similar to the acoustic excitation device 14 and/or the preliminary excitation component 102 (Shown in FIG. 1 and described herein).

At operation 204, measurements of the preliminary acoustic excitations in the structure may be obtained. In some implementations, operation 204 may be performed by a component the same as or similar to the acoustic measurement device 15 and/or the preliminary measurement component 104 (Shown in FIG. 1 and described herein).

At operation 206, a subset of the multiple excitation frequencies may be selected to be used to inspect the structure based on the measurements of the preliminary acoustic excitations in the structure and/or other information. In some implementations, operation 206 may be performed by a component the same as or similar to the excitation frequency selection component 106 (Shown in FIG. 1 and described herein).

At operation 208, inspection acoustic excitations may be generated in the structure using the subset of the multiple excitation frequencies. In some implementations, operation 208 may be performed by a component the same as or similar to the acoustic excitation device 14 and/or the inspection excitation component 108 (Shown in FIG. 1 and described herein).

At operation 210, measurements of the inspection acoustic excitations in the structure may be obtained. In some implementations, operation 210 may be performed by a component the same as or similar to the acoustic measurement device 15 and/or the inspection measurement component 110 (Shown in FIG. 1 and described herein).

At operation 212, one or more properties of the structure may be determined based on the measurements of the inspection acoustic excitations in the structure and/or other information. In some implementations, operation 212 may be performed by a component the same as or similar to the property component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method for inspecting a structure, the method comprising:

generating preliminary acoustic excitations in the structure using multiple excitation frequencies, wherein the preliminary acoustic excitations in the structure include preliminary steady state acoustic excitations in the structure;

obtaining measurements of the preliminary acoustic excitations in the structure;

selecting a subset of the multiple excitation frequencies to be used to inspect the structure based on the measurements of the preliminary acoustic excitations in the structure;

generating inspection acoustic excitations in the structure using the subset of the multiple excitation frequencies, wherein the inspection acoustic excitations in the structure include inspection steady state acoustic excitations in the structure;

obtaining measurements of the inspection acoustic excitations in the structure; and determining one or more properties of the structure based on the measurements of the inspection acoustic excitations in the structure.

2. The method of claim 1, wherein the measurements of the preliminary acoustic excitations in the structure include partial measurements of the preliminary acoustic excitations in the structure, and the measurements of the inspection acoustic excitations in the structure include full measurements of the inspection acoustic excitations in the structure.

3. The method of claim 1, wherein the measurements of the preliminary acoustic excitations in the structure include measurements of velocity responses in the structure.

4. The method of claim 3, wherein selecting the subset of the multiple excitation frequencies to be used to inspect the structure based on the measurements of the preliminary acoustic excitations in the structure includes selecting the subset of the multiple excitation frequencies based on summary statistic of the velocity responses in the structure.

5. The method of claim 1, wherein determining the one or more properties of the structure based on the measurements of the inspection acoustic excitations in the structure includes:

generating damage maps of the structure based on the measurements of the inspection acoustic excitations in the structure;

generating a combined damage map from the damage maps; and determining the one or more properties of the structure based on the combined damage map.

6. The method of claim 5, wherein the damage maps are generated based on filtering the measurements of the inspection acoustic excitations in the structure.

7. The method of claim 1, wherein the one or more properties of the structure include a defect in the structure.

8. The method of claim 7, wherein the defect in the structure includes material addition, material loss, or material cracking.

9. The method of claim 1, wherein the structure includes a hollow structure, a support structure, or a moving structure.

10. The method of claim 1, wherein:

the structure includes a steel plate having steel columns and steel plate stiffeners; and the preliminary acoustic excitations and the inspection acoustic excitations are generated by one or more transducers attached to one or more of the steel columns.

11. The method of claim 10, wherein the one or more properties of the structure determined based on the inspection acoustic excitations in the structure include pitting, corrosion, and/or cracking of the steel plate.

12. The method of claim 1, wherein:

the structure includes a steel pipe section; and the preliminary acoustic excitations and the inspection acoustic excitations are generated by one or more transducers attached to the steel pipe section.

13. The method of claim 12, wherein the one or more properties of the structure determined based on the inspection acoustic excitations in the structure include pitting, corrosion, and/or cracking of the steel pipe section.

14. A system for inspecting a structure, the system comprising:

an acoustic excitation device configured to generate acoustic excitations in a structure;

an acoustic measurement device configured to measure the acoustic excitations in the structure generated by the acoustic excitation device;

one or more physical processors configured by machine-readable instructions to:

obtain measurements taken by the acoustic measurement device of preliminary acoustic excitations in the structure, the preliminary acoustic excitations in the structure generated by the acoustic excitation device using multiple excitation frequencies, wherein the preliminary acoustic excitations in the structure include preliminary steady state acoustic excitations in the structure;

select a subset of the multiple excitation frequencies to be used to inspect the structure based on the measurements of the preliminary acoustic excitations in the structure, wherein inspection acoustic excitations in the structure are generated using the subset of the multiple excitation frequencies;

obtain measurements taken by the acoustic measurement device of the inspection acoustic excitations generated in the structure by the acoustic excitation device, wherein the inspection acoustic excitations in the structure include inspection steady state acoustic excitations in the structure; and determine one or more properties of the structure based on the measurements of the inspection acoustic excitations in the structure.

15. The system of claim 14, wherein the measurements of the preliminary acoustic excitations in the structure include partial measurements of the preliminary acoustic excitations in the structure, and the measurements of the inspection acoustic excitations in the structure include full measurements of the inspection acoustic excitations in the structure.

16. The system of claim 14, wherein the measurements of the preliminary acoustic excitations in the structure include measurements of velocity responses in the structure.

17. The system of claim 16, wherein selection of the subset of the multiple excitation frequencies to be used to inspect the structure based on the measurements of the preliminary acoustic excitations in the structure includes selection of the subset of the multiple excitation frequencies based on summary statistic of the velocity responses in the structure.

18. The system of claim 14, wherein determination of the one or more properties of the structure based on the measurements of the inspection acoustic excitations in the structure includes:

generation of damage maps of the structure based on the measurements of the inspection acoustic excitations in the structure;

generation of a combined damage map from the damage maps; and determination of the one or more properties of the structure based on the combined damage map.

19. The system of claim 18, wherein the damage maps are generated based on filtering the measurements of the inspection acoustic excitations in the structure.

* * * * *